United States Patent [19]
Hasegawa

[11] Patent Number: 5,862,476
[45] Date of Patent: Jan. 19, 1999

[54] MOBILE STATION EQUIPMENT AND BASE STATION EQUIPMENT AND CONTROL METHOD

[75] Inventor: Hajime Hasegawa, Kawasaki, Japan

[73] Assignee: Fujitsu Limited, Kanagawa, Japan

[21] Appl. No.: 533,477

[22] Filed: Sep. 25, 1995

[30] Foreign Application Priority Data

Mar. 3, 1995 [JP] Japan .................................. 7-043935

[51] Int. Cl.⁶ ...................................................... H04B 7/26
[52] U.S. Cl. .......................... 455/422; 455/455; 455/517; 455/575
[58] Field of Search .................... 455/33.1, 34.1, 455/34.2, 53.1, 54.1, 54.2, 56.1, 62, 63, 67.1, 68, 69, 70, 89, 126, 422, 434, 435, 436, 440, 450, 452, 455, 458, 507, 509, 515, 517, 524, 525, 575; 379/59

[56] References Cited

U.S. PATENT DOCUMENTS 5,293,641  3/1994  Kallin et al. .......................... 455/54.2
5,455,964  10/1995  Roos et al. ............................ 455/34.2
5,535,429  7/1996  Bergenlid et al. ..................... 455/34.2

Primary Examiner—Thanh Cong Le
Attorney, Agent, or Firm—Helfgott & Karas, P.C.

[57] ABSTRACT

Mobile station equipment for a mobile communication system includes a decision section for deciding accuracy of data of a first signal transmitted from a base station, and a first signal strength measuring section for measuring a signal strength of the first signal. The mobile station equipment further includes an inquiring section for transmitting a permission request signal for a stand-by state process to the base station according to at least one of the decided accuracy and a comparison result of the measured signal strength of the first signal and a first given threshold value. And, in the mobile station equipment, a stand-by control section waits for permissible information to be transmitted from the base station equipment based on the permission request signal, and starts a stand-by state process upon receiving the permissible information.

19 Claims, 18 Drawing Sheets

FIG. 12

| IDENTIFICATION INFORMATION | A NUMBER OF THE TRANSMITTING MOBILE STATION |
|---|---|

FIG. 13

| IDENTIFICATION INFORMATION | A NUMBER OF THE MOBILE STATION WHERE THE INFORMATION IS TRANSMITTED TO |
|---|---|

FIG. 18
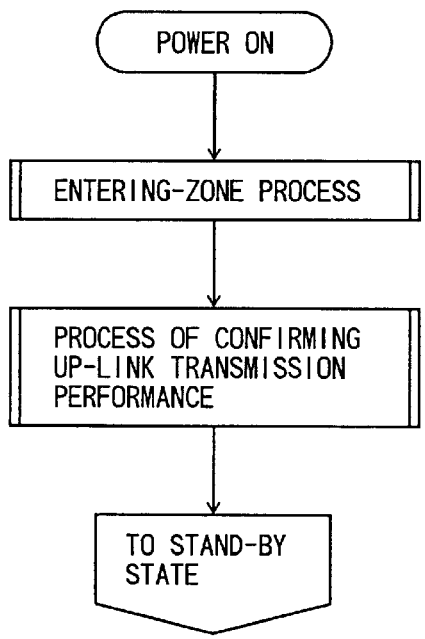
FIG. 19
STAND-BY-PERMISSION REQUEST
DUMMY BURST 1
DUMMY BURST (n-1)

FIG. 20

| INFORMATION TO BE TRANSMITTED | RECEIVE SIGNAL STRENGTH IN THE BASE STATION |
|---|---|
| STAND-BY PERMISSION REQUEST | $E_1$ |
| DUMMY BURST 1 | $E_2$ |
| ⋮ | ⋮ |
| DUMMY BURST (n-1) | $E_n$ |
| | $(1/n)\Sigma E_i$ |

FIG. 21

STAND-BY-PERMISSION REQUEST 1

| IDENTIFICATION INFORMATION | IDENFICATION NUMBER OF TRANSMITTING MOBILE STATION |
|---|---|

STAND-BY-PERMISSION REQUEST 2

| IDENTIFICATION INFORMATION | IDENFICATION NUMBER OF TRANSMITTING MOBILE STATION |
|---|---|

⋮

STAND-BY-PERMISSION REQUEST n

| IDENTIFICATION INFORMATION | IDENFICATION NUMBER OF TRANSMITTING MOBILE STATION |
|---|---|

MOBILE STATION EQUIPMENT AND BASE STATION EQUIPMENT AND CONTROL METHOD

BACKGROUND OF THE INVENTION

1. Field of the Invention

The present invention generally relates to mobile station equipment, base station equipment, and a control method, and more particularly, to mobile station equipment, base station equipment, and a control method which are used to set a stand-by state of the mobile station in mobile communication systems.

2. Description of the Prior Art

In a mobile communication system such as a digital automobile telephone system, a variety of types of mobile station equipment such as a portable type, an on-vehicle type, and a portable on-vehicle-mountable type are used. In general, according to the type of the mobile station equipment, antenna configurations and transmission powers of the equipment are different. The portable and on-vehicle-mountable types of mobile station equipment may be moved to narrow spaces and into buildings to where the on-vehicle type of mobile station equipment cannot be moved. In this case, for the portable and on-vehicle-mountable types of mobile station equipment, a radio transmission path between a mobile station and a base station has a large transmission loss. And, a large multipath fading is caused by surrounding buildings and mountains, etc. As a result, a good transmission performance may not be necessarily obtained.

FIG. 1 shows a block diagram of a configuration example of conventional base station equipment. In FIG. 1, a transmit antenna 51 and a receive antenna 52 are respectively connected to corresponding antenna terminals of amplifier equipment 53. Ports of the amplifier equipment 53 are connected with transmitter/receiver shelves 55-1 to 55-3 through divider/combiner parts 54-1 to 54-3. Control inputs and outputs of the transmitter/receiver shelves 55-1 to 55-3 are connected to corresponding inputs and outputs of base-station control equipment 56. PCM-input-and-output terminals of the transmitter/receiver shelves 55-1 to 55-3 are connected to a PCM interface part 57. Further, the PCM interface part 57 is connected to synchronous terminal equipment 58 which is connected to a control center (not shown) through a transmission line.

The transmitter/receiver shelf 55-1 comprises transmitting-and-receiving parts 59-11 to 59-1N (N is a given number) which respectively correspond to a plurality of radio channels, and a shelf control part 60-1 generally controlling these transmitting-and-receiving parts 59-11 to 59-1N. The transmitter/receiver shelves 55-2, 55-3 also have the same configuration as that of the transmitter/receiver shelf 55-1.

FIG. 2 shows a block diagram of a configuration example of conventional mobile station equipment. In FIG. 2, an antenna 71-1 is connected to an antenna terminal of a transmit/receive duplexer 72, and a received signal from the antenna 71-1 is supplied to one input of a demodulator 74 through a receiving part 73-1. A received signal from an antenna 71-2 is supplied to the other input of the demodulator 74 through a receiving part 73-2. An output of the demodulator 74 is supplied to a TDMA part 75. The received signal passed through the TDMA part 75 is supplied to a codec (coder and decoder) 76 to be decoded. A decoded signal from the codec 76 is supplied to a speaker 77.

On the other hand, an output signal from a microphone 78 which forms a handset with the speaker 77 is supplied to the codec 76 to be coded. Coded signal from the codec 76 is supplied to a waveform-shaping part 79 through the TDMA part 75. A waveform-shaped signal from the waveform-shaping part 79 is supplied to a quadrature modulator 80, and modulates a carrier from a frequency synthesizer 82. The modulated carrier is supplied to a power amplifier 81, and is transmitted through the transmit/receive duplexer 72 and the antenna 71-1. Amplitude information of the waveform-shaped signal of the waveform-shaping part 79 is provided to the power amplifier 81 to control its operational point and increase its power efficiency. A receive local signal from the frequency synthesizer 82 is supplied to the receiving parts 73-1, 73-2. The TDMA part 75, the frequency synthesizer and the receiving parts 73-1, 73-2 are controlled by a control part 83, and specified signals of the control part 83 are supplied to a display/operation part 84.

In the above-mentioned base station equipment, a part of the transmitting-and-receiving parts installed in the transmitter/receiver shelves 55-1 to 55-3 is previously selected to be used for a control channel. Based on control from the base-station control equipment 56 and the shelf control part 60-1, through the control channel, broadcast information is transmitted repeatedly, and a radio channel is set. The previously selected transmitting-and-receiving part communicates and interfaces with networks through the PCM interface part 57 and the synchronous terminal equipment 59.

Next, an operation of the conventional mobile station equipment will be discussed. FIG. 3 and FIG. 4 show flowcharts of the operation of the conventional mobile station equipment shown in FIG. 2. In the control part 83 shown in FIG. 2, a single or a plurality of perch frequencies are previously set. In FIG. 3, when a power is turned on, one of the perch frequencies is set in the frequency synthesizer 82 by the control part 83 (step S1). The frequency synthesizer 82 generates the perch frequency thus set, and provides the local signal of the perch frequency to the receiving parts 73-1, 73-2 and quadrature modulator 80. The receiving part 73-1 measures receive signal strength L1 of a broadcast signal which is received from the base station on the radio channel of the perch frequency (step S2). The control part 83 compares the receive signal strength L1 with the minimum signal strength Lth1 (which is referred to as a threshold level, hereinafter) (step S3). The threshold level Lth1 is a reference level for a connection in a service zone defined by this base station. When the receive signal strength L1 is equal to or larger than the threshold level Lth1, the measured receive signal strength L1 and the perch frequency are stored in a memory (not shown) (step S4). And, when the receive signal strength L1 is smaller than the threshold level Lth1, such a storage process is omitted and the operation proceeds to the next step. The above-mentioned successive processes are repeated for all perch frequencies (step S5).

After the above processes in step S5 are completed, the control part 83 determines whether or not any perch frequency is stored in the memory (step S6). When the perch frequency is not stored in the memory, it is supposed that the mobile station is not in any radio zone (step S7). This condition is referred to as out-of-zone, hereinafter. In this case, the above-mentioned successive processes (step 1 to step 6) are repeated.

When any perch frequency is stored in the memory, the control part 83 sorts the perch frequencies stored in the memory in an order of higher receive signal strengths L1 (step S8). And, the control part 83 selects the perch frequency having the highest receive signal strength in a top priority from the sorted perch frequencies and sets the frequency synthesizer 82 to the a selected perch frequency (step S9). And, subsequently, with the receiving part 73-1, the control part 83 measures a receive signal strength L2 of the broadcast signal which is received on the selected perch frequency (step S10).

The receiving part 73-1 supplies the received broadcast signal to the demodulator 74. The demodulator 74 demodulates the broadcast signal, and generates a baseband signal. The TDMA part 75 analyzes the baseband signal based on a predetermined frame structure, and provides an analyzed result to the control part 83.

The control part 83 determines whether or not the broadcast signal is regularly received by examining data of the broadcast signal (step S1). When the control part 83 determines that the broadcast signal is not regularly received by the examination, the next higher-strength perch frequency in the order of the stored perch frequencies is set to the frequency synthesizer 82, and the successive processes of the steps S9 to S11 are repeated for that perch frequency (step S12). During these processes, when it is determined that the broadcast signal is regularly received by the examination of the data of the broadcast signal, the receive signal strength L2 of the broadcast signal is measured again through the receiving part 73-1 by the control part 83. And, the receive signal strength L2 is compared with the minimum signal strength Lth2 which permits a stand-by operation for receiving a call (step S11'). The minimum signal strength Lth2 is referred to as a down-link stand-by permission level.

When the control part 83 recognizes that the receive signal strength L2 is equal to or larger than the down-link stand-by permission level Lth2 in the above comparison, the process proceeds to the stand-by state mentioned later. When the control part 83 recognizes that the receive signal strength L2 is smaller than the down-link stand-by permission level Lth2, in the same way as the case that the broadcast signal is not regularly received, the frequency synthesizer 82 is set to the next higher-strength perch frequency in the sorted order of the perch frequencies. And, the processes of steps S9 to S11 are repeated in the sorted order until a condition L2≧Lth2 is satisfied or a last frequency is set (step S12). The above-mentioned processes of the control part 83 from a power-on timing or the out-of-zone state to the stand-by state, steps S1 to S12 are referred to as an entering zone process, hereinafter.

In the stand-by state shown in FIG. 4, the control part 83 measures a receive signal strength L3 of the radio channel at a given time interval through the receiving part 73-1 (step S13). Then, the receive signal strength L3 is compared with the minimum signal strength Lth3 which permits the stand-by state to be continued (step S14). The least signal strength Lth3 is referred to a down-link stand-by degradation level, hereinafter. When the control part 83 recognizes that the receive signal strength L3 is equal to or larger than the signal strength Lth3 in the above comparison, the process is maintained at the stand-by state. When the control part 83 recognizes that the receive signal strength L3 is smaller than the signal strength Lth3, the mobile station is assumed to be out-of-zone, and the successive processes of steps S1 to S6 shown in FIG. 3 are carried out (step S7 shown in FIG. 3).

When the mobile station is in the stand-by state, the control part 83 supervises an operation from a user through the display/operation part 84. And, the control part 83 examines control information (for example, a selection calling command) which is received from the base station through the antenna 71, the transmit/receive duplexer 72, the receiving part 73-1, the demodulator and the TDMA part 75. Further, the control part 83 detects information (for example, a location registration request) for the mobile station transmitted from the base station based on the predetermined control procedures. Thereby, the mobile station may detect a call (step S15 in FIG. 4), and associated processes with the call are performed (step S16).

In the above processes, the control information (for example, a call request) generated in the control part 83 is put into the TDMA frame by the TDMA part 75. A bit sequence of the TDMA frame is filtered by the waveform-shaping process in the waveform-shaping part 79. And, a filtered signal from the waveform-shaping part 79 is converted to a π/4-shifted QPSK signal by the quadrature modulator 80, and is transmitted to the base station through the power amplifier 81 and the transmit/receive duplexer 71-1.

Next, an operation of the conventional base station equipment will be discussed. FIG. 5 shows a flowchart of the operation of the conventional base station equipment shown in FIG. 1. In the base station, the base-station control equipment 56 connected to the base station transmits and receives a variety of control information (for example, a selection calling command, a location registration request, a call request, etc.) with the mobile station equipment located in the radio zone defined by the base station through the base station equipment. And, when any control information from the mobile station equipment is received, the base-station control equipment 56 analyzes the control information (steps S17, 18 shown in FIG. 5), and processes adaptive to these analysis result of the predetermined plural processes are successively carried out (step S19).

In the above description, the down-link stand-by permission level Lth2 and the down-link stand-by degradation level Lth3 may be transmitted to the mobile station by the base station equipment along it with the broadcast information. However, to simplify the description, it is assumed that the mobile station equipment previously has the down-link stand-by permission level Lth2 and the down-link stand-by degradation level Lth3.

Next, a description will be given of disadvantages of the conventional mobile and base station equipment. FIG. 6 shows a conventional control sequence between the mobile station equipment and the base station equipment. In the conventional mobile station equipment, as shown in FIG. 6, when the broadcast information from the base station is regularly received on the control channel, and the receive signal strength of the control channel in the mobile station equipment (which is referred to as a down-link signal strength) is larger than the down-link stand-by permission level Lth2, the mobile station equipment is in the stand-by state on the control channel. The above process is carried out regardless of a level of a signal which the base station receives from the mobile station. Therefore, for the portable-type and the on-vehicle-mountable-type mobile station equipment in which the transmission power is relatively low, the receive signal strength detected in the base station (which is referred to as an up-link signal strength) may be extremely small as compared to the down-link signal strength in the mobile station.

Accordingly, a large difference between the transmission performance of the up-link and down-link radio lines between the base station and the mobile station occurs. In this case, the control signal may not be regularly transmitted and received between the base and mobile stations, and, thus, the radio transmission path for a call may not be established. Even if the radio transmission path is established, a sufficient speech quality of the call may not be obtained and a service quality may be degraded. Furthermore, by the degradation of the quality, a disconnecting process may be forcibly performed based on the control sequence.

SUMMARY OF THE INVENTION

It is an object of the present invention to provide mobile station equipment and base station equipment in which a difference between transmission performance of up- and down-link radio transmission lines may be reduced.

It is another object of the present invention to provide a control method of setting a stand-by state in a mobile station. In the stand-by state, the difference between transmission performance of the up- and down-link radio transmission lines may be reduced.

This permits the disadvantages described above to be eliminated.

The object described above is achieved by mobile station equipment for a mobile communication system comprising: a decision section for deciding accuracy of data of a first signal transmitted from a base station; a first signal strength measuring section for measuring a signal strength of the first signal; an inquiring section for transmitting a permission request signal for the mobile station equipment proceeding to a stand-by state process to the base station according to at least one of the decided accuracy and a comparison result of the measured signal strength of the first signal and a first given threshold value; and a stand-by control section for waiting for permissible information to be transmitted from the base station based on the permission request signal, and for starting the stand-by state process upon receiving the permissible information.

According to the above mobile station equipment, after it is confirmed that down-link radio line transmission performance is sufficient to supply a communication service, the confirmation result is transmitted to the base station. And, when the permissible information in response to the confirmation result is received, the mobile station equipment proceeds to the stand-by state process.

Therefore, the mobile station equipment may request confirmation of up-link radio line transmission performance to the base station. And, since both the up- and down-link radio line transmission performance may be confirmed before the stand-by state process, a good quality communication service may be surely provided.

The object described above is also achieved by base station equipment for a mobile communication system comprising: a second signal strength measuring section for measuring a signal strength of a permission request signal for proceeding to a stand-by state process transmitted from a mobile station; and a responding section for transmitting permissible information for permitting the mobile station to proceed to the stand-by state process to the mobile station according to a comparison result of the signal strength of the permission request signal and a second given threshold value.

According to the above base station equipment, the mobile station is informed whether or not the up-link radio line transmission performance is sufficient to supply the communication service. Therefore, a good transmission performance of a communication path for a call being established may be maintained.

The object described above is also achieved by the mobile station equipment mentioned above, wherein the stand-by control section further comprises control a section for waiting for impermissible information transmitted from the base station equipment based on the permission request signal, and for proceeding to an out-of-zone state upon receiving the impermissible information.

According to the mobile station equipment, the stand-by control section waits for the permissible information and the impermissible information to be transmitted from the base station in response to the permission request signal transmitted from the inquiring section. When the impermissible information is received, the stand-by state process is not started, and when the permissible information is received, the stand-by state process is started.

Therefore, since the transfer to the stand-by state is on hold when the impermissible information is received, an attempt to transfer to the stand-by state on another radio channel and an attempt to transfer to an inside-of-zone state in another radio zone may be immediately started.

The object described above is also achieved by the base station equipment mentioned above, wherein the responding section comprises a section for transmitting impermissible information for not permitting the mobile station to proceed to the stand-by state process to the mobile station when the signal strength of the permission request signal is smaller than the second given threshold value.

According to the above base station equipment, when the up-link radio line transmission performance is not sufficient to supply the good communication service, the impermissible information is transmitted to the mobile station equipment.

The object described above is also achieved by the mobile station equipment mentioned above, wherein the equipment further comprises: a third signal strength measuring section for measuring a signal strength of a second signal from an adjacent base station in a stand-by state; and a zone-transfer detection section for comparing a difference between the measured signal strength of the first signal from the base station and the measured signal strength of the second signal from the adjacent base station with a third given value, and for determining whether the mobile station equipment is located in a radio zone defined by the adjacent base station according to the comparison result of the difference and the third given value; wherein each of the decision section and the stand-by control section further comprises a section for changing the base station to the adjacent base station recognized by the zone-transfer detection section, and for switching a radio channel suitable for the adjacent base station.

According to the above mobile station equipment, when the mobile station equipment transfers to a new radio zone, the up- and down-link transmission performances are surely confirmed. Therefore, even if the mobile station equipment moves anywhere, the good transmission performance of the radio line may be always maintained.

The object described above is also achieved by the mobile station equipment mentioned above, wherein the inquiring section further comprises a section for transmitting the permission request signal to the base station at a given time interval in a stand-by state.

According to the above mobile station equipment, even if the up- and down-link transmission performances fluctuate due to moving of the mobile station equipment and other circumstances, the transmission performances are properly confirmed. Therefore, chances for selecting the radio zone and the radio channel may be increased.

The object described above is also achieved by the mobile station equipment mentioned above, wherein the inquiring section further comprises a section for transmitting the permission request signal to the base station according to the decided accuracy and the comparison result of the measured signal strength of the first signal and the first given threshold value when a communication is finished.

According to the above mobile station equipment, even if a transmission loss in a radio transmission path is increased during a call, or even if the transmission performance of the radio transmission path is degraded due to circumstances when the call is finished, the transmission performance is properly confirmed. Therefore, the chances for selecting the radio zone and the radio channel may be increased.

The object described above is also achieved by the mobile station equipment mentioned above, wherein: the equipment further comprises a state detection section for detecting that a state of the mobile station equipment is an out-of-zone state; and the inquiring section further comprises a section for transmitting the permission request signal for the stand-by state process to the base station according to the decided accuracy and the comparison result of the measured signal strength of the first signal and the first given threshold value when the state detection section detects that the state of the mobile station equipment is the out-of-zone state.

According to the above mobile station equipment, when the mobile station equipment transfers to the inside-of-zone state, after the up- and down-link radio line transmission performance is confirmed, the stand-by-state process is started. Therefore, a good quality communication service may be provided.

The object described above is also achieved by the mobile station equipment mentioned above, wherein the permission request signal transmitted by the inquiring section comprises a plurality of frames, a first frame having identification information which indicates that this frame is for the permission request signal and identification information of the mobile station equipment, and each of the following frames having the identification information of the mobile station equipment.

According to the above mobile station equipment, the permission request signal is transmitted in a form of a plurality of frames. Therefore, even if the up-link transmission performance is degraded, the signal strength of the permission request signal may be surely measured. Accordingly, the up-link transmission performance may be further surely confirmed before starting the stand-by state process. And, this mobile station equipment is also applicable to a high-bit-rate digital transmission system.

The object described above is also achieved by the mobile station equipment mentioned above, wherein the permission request signal transmitted by the inquiring section comprises a plurality of frames, each of the frames having identification information which indicates that this frame is for the permission request signal and identification information of the mobile station equipment.

According to the above mobile station equipment, the permission request signal is transmitted in a form of redundant plural frames. Therefore, even if the up-link transmission performance is degraded, the signal strength of the permission request signal may be surely measured. Accordingly, the up-link transmission performance may be further surely confirmed before starting the stand-by state process. And, this mobile station equipment is also applicable to a high-bit-rate digital transmission system.

The object described above is also achieved by the base station equipment mentioned above, wherein when the second given threshold value used in the responding section becomes higher than a signal strength in the base station equipment, it is determined that the mobile station in a radio zone defined by the base station equipment goes to an out-of-zone state.

According to the above base station equipment, for the mobile station which is transferring to the out-of-zone state while confirming the up- and down-link transmission performances in the radio zone, the base station equipment may surely decided whether or not the mobile station is permitted to transfer.

The object described above is also achieved by the base station equipment mentioned above, wherein when the second given threshold value used in the responding section is smaller than a signal strength in the base station equipment, the mobile station is permitted to go to an inside-of-zone state for a radio zone defined by the base station equipment.

According to the above base station equipment, for the mobile station which is transferring to the inside-of-zone state again while confirming the up- and down-link transmission performances in the radio zone, the base station equipment may surely decided whether or not the mobile station is permitted to transfer.

The object described above is also achieved by a control method for controlling a mobile station to proceed to a stand-by state in a mobile communication system, the control method comprising the steps of: (a) deciding accuracy of data of a first signal transmitted from a base station in the mobile station; (b) measuring a signal strength of the first signal in the mobile station; (c) transmitting a permission request signal for the mobile station proceeding to a stand-by state process from the mobile station to the base station according to the decided accuracy in step (a) and a comparison result of the measured signal strength of the first signal in step (b) and a first given threshold value; (d) measuring a signal strength of the permission request signal transmitted from the mobile station in the base station; (e) transmitting permissible information for permitting the mobile station to proceed to the stand-by state process from the base station to the mobile station according to a comparison result of the signal strength of the permission request signal in step (d) and a second given threshold value; and (f) waiting for permissible information to be transmitted from the base station equipment, and starting the stand-by state process when receiving the permissible information in the mobile station.

The object described above is also achieved by the control method mentioned above, wherein: the step (e) further comprises a step of transmitting impermissible information for not permitting the mobile station to proceed to the stand-by state process from the base station to the mobile station when the signal strength of the permission request signal is smaller than the second given threshold value; and the step (f) further comprises a step of waiting for impermissible information to be transmitted from the base station equipment, and proceeding to an out-of-zone state when receiving the impermissible information.

According to the above control method, after it is confirmed that down-link radio line transmission performance is sufficient to supply the communication service, the confirmation result as the permission request is transmitted to the base station. And, when the permissible information in response to the confirmation result is received, the mobile station equipment proceeds to the stand-by state process.

Therefore, both the up- and down-link radio line transmission performances may be confirmed before the stand-by state process, and a good quality communication service may be surely provided.

Other objects and further features of the present invention will be apparent from the following detailed description when read in conjunction with the accompanying drawings.

BRIEF DESCRIPTION OF THE DRAWINGS

FIG. 12 shows a signal format of the stand-by-permission request;

FIG. 13 shows a signal format of the stand-by-permissible information;

FIG. 18 shows a flowchart of an operation of a sixth embodiment of the mobile station equipment according to the present invention;

FIG. 19 shows signal formats of the stand-by-permission request signal and dummy burst signals of a seventh embodiment of the mobile station equipment;

FIG. 20 shows receive signal strength of the stand-by-permission request signal and the dummy burst signals shown in FIG. 19; and FIG. 21 shows signal formats of the up-link stand-by permission request signals of an eighth embodiment of the mobile station equipment.

DESCRIPTION OF THE PREFERRED EMBODIMENTS

Figure 7:
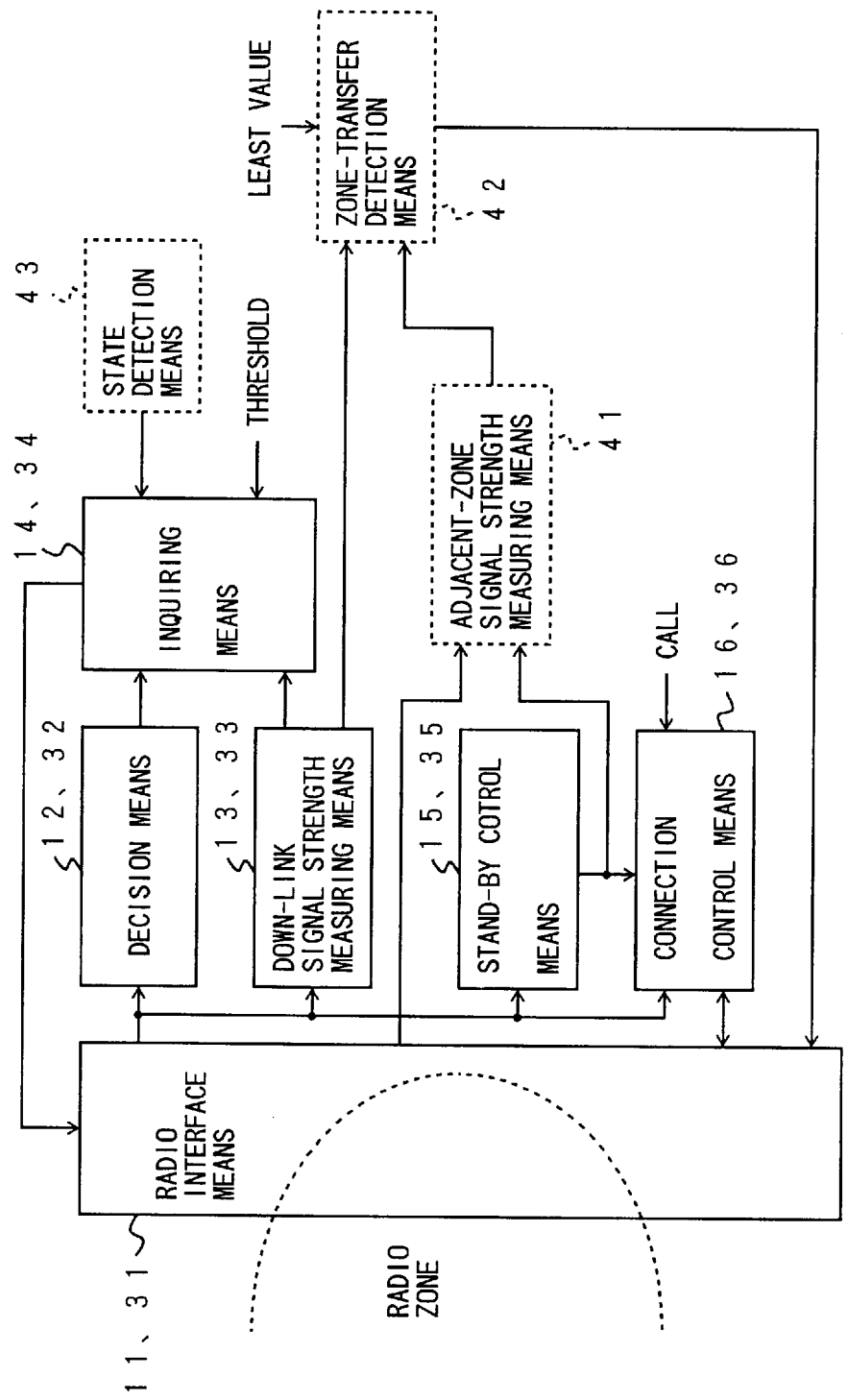
FIG. 7 shows a block diagram of an embodiment of mobile station equipment according to the present invention.
Figure 8:
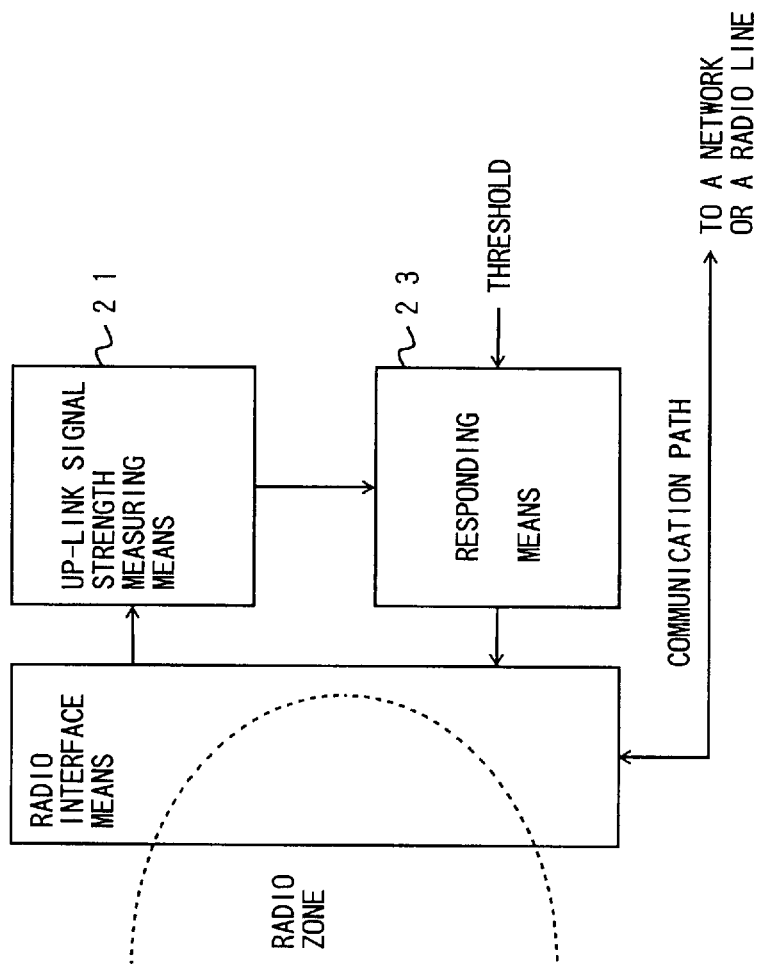
FIG. 8 shows a block diagram of an embodiment of base station equipment according to the present invention.

First, descriptions will be given of embodiments of mobile station equipment and base station equipment according to the present invention, by referring to FIGS. 7, 8. FIG. 7 shows a block diagram of the embodiment of the mobile station equipment according to the present invention. FIG. 8 shows a block diagram of the embodiment of the base station equipment according to the present invention.

Figure 1:
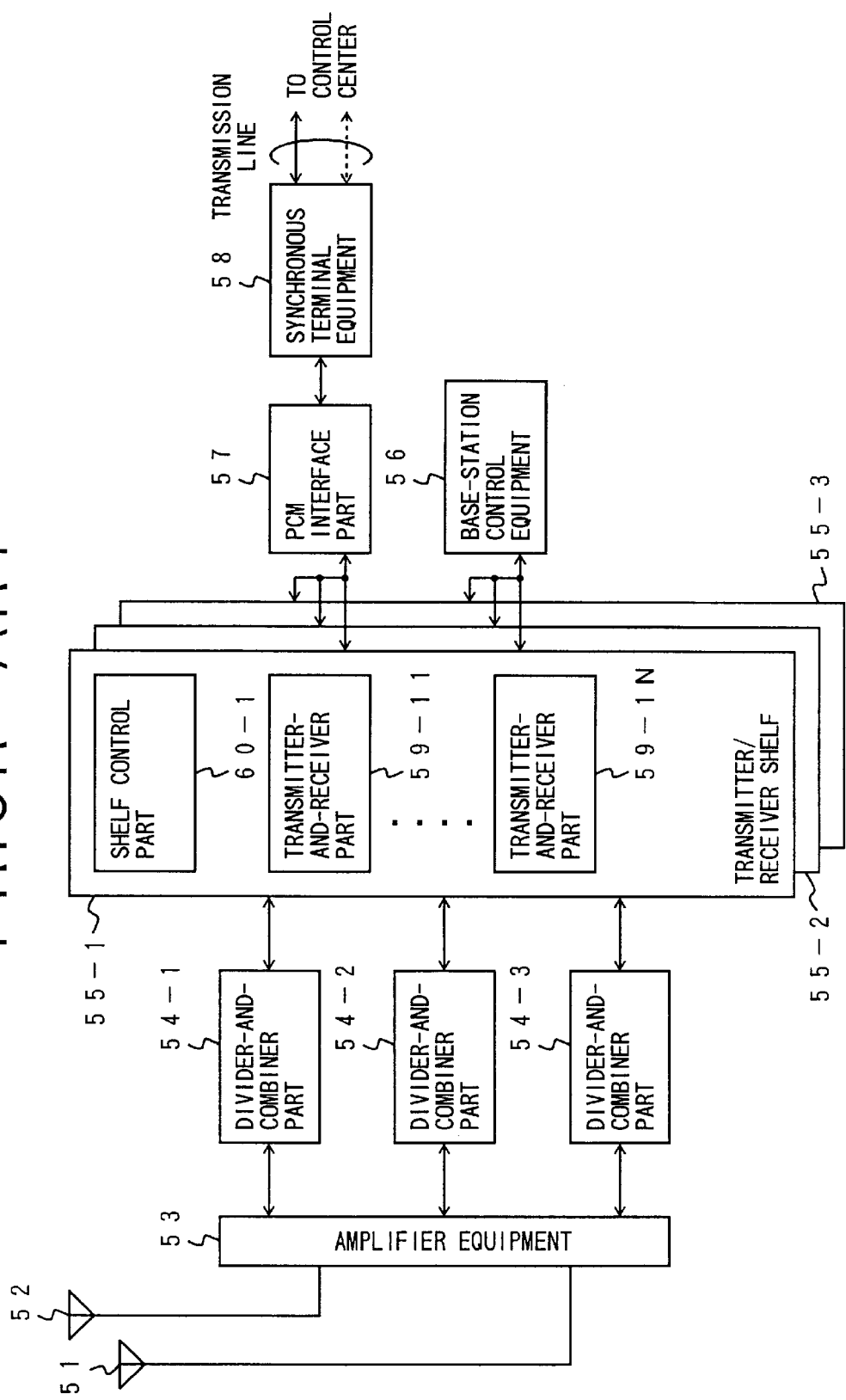
FIG. 1 shows a block diagram of a configuration example of conventional base station equipment.

In the mobile station equipment shown in FIG. 7, each means may include components of the conventional mobile station equipment shown in FIG. 1. Radio interface means 11 (or 31) may include the antenna 71-1, the transmit/receive duplexer 72, the receiving part 73-1, the demodulator 74, the frequency synthesizer 82, the TDMA part 75, the waveform-shaping part 72, the quadrature modulator 80 and the power amplifier 81 of the conventional mobile station equipment shown in FIG. 1. Down-link signal strength measuring means 13 (or 33) may include a portion of the receiving part 73-1 and a portion of the control part 83. Connection control means 16 (or 36) may include a portion of the control part 83, the display/operation part 84, a portion of the TDMA part 75, the codec 76, the speaker 77, and the microphone 78. And, decision means 12 (or 32), inquiring means 13 (34), stand-by control means 15 (or 35), zone-transfer detection means 42, and state detection means 43 may be constructed with the control means 83 of the conventional mobile station equipment shown in FIG. 1. Further, adjacent-zone signal strength measuring means 41 may include the antenna 71-2, the receiving part 73-2, and a portion of the control part 83.

Figure 2:
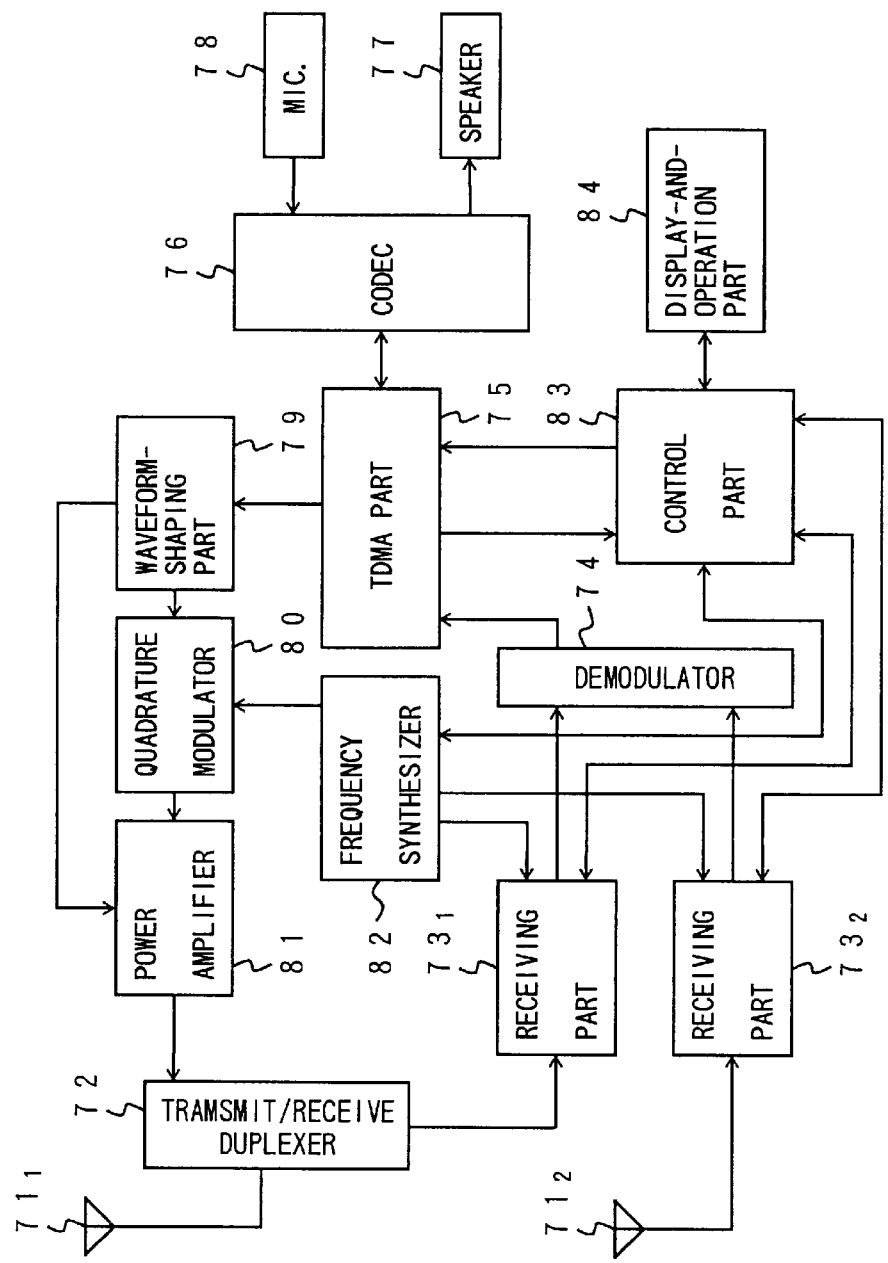
FIG. 2 shows a block diagram of a configuration example of conventional mobile station equipment.

Also, in the base station equipment shown in FIG. 8, each means may include components of the conventional base station equipment shown in FIG. 2. Up-link signal strength measuring means 21 may include the antennas 51, 52, the amplifier equipment 53, the divider/combiner parts 54-1 to 54-3, and the transmitter/receiver shelves 55-1 to 55-3. And, responding means 23 corresponds to the base-station control equipment 56.

In the following discussion, the description will be performed by using the components of the conventional mobile and base station equipment as necessary.

Next, operations will be discussed of first embodiments of the mobile station equipment and the base station equipment according to the present invention, by referring to FIGS. 9, 10, 11A, 11B.

Figure 9:
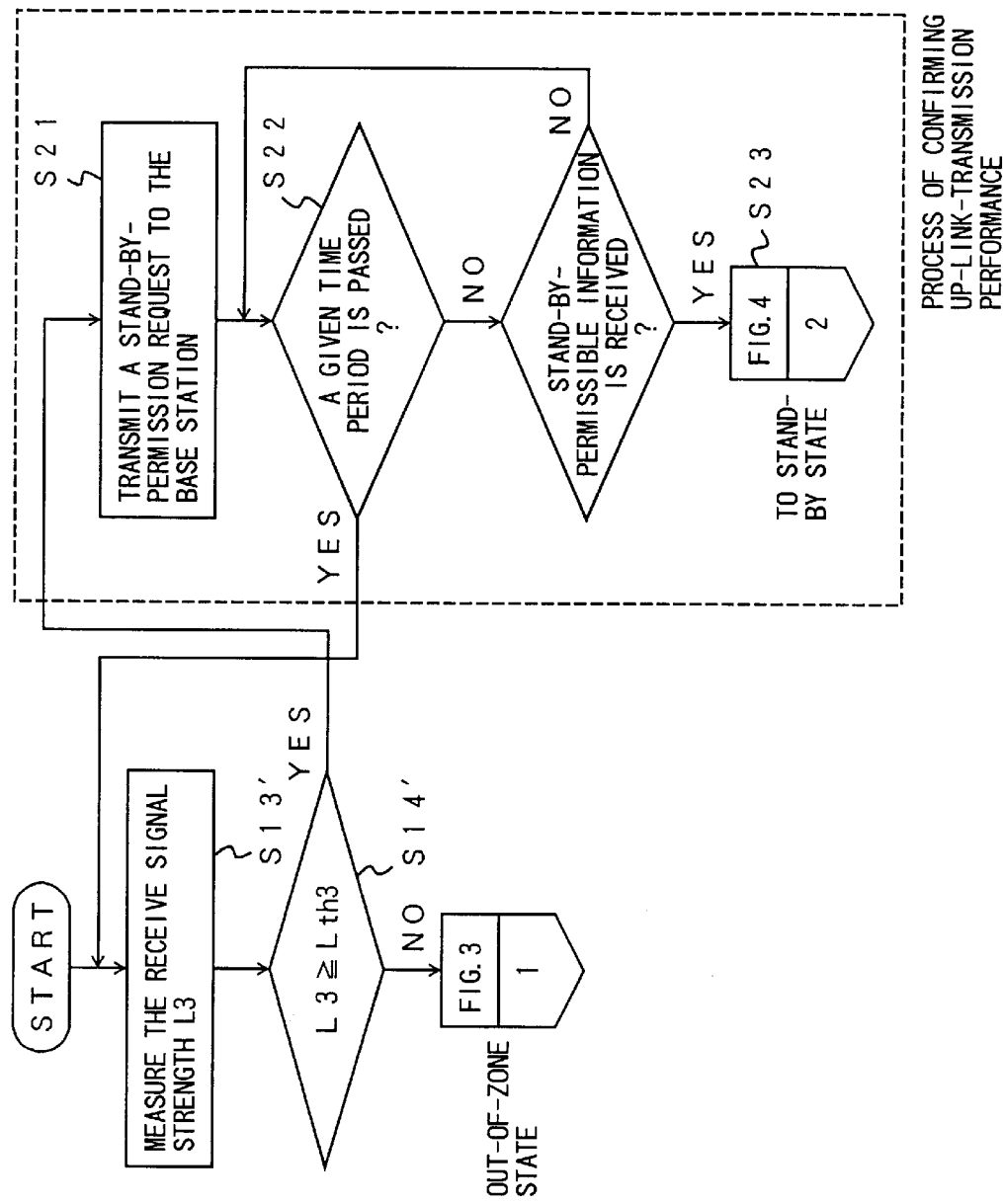
FIG. 9 shows a flowchart of an operation of a first embodiment of the mobile station equipment according to the present invention.
Figure 10:
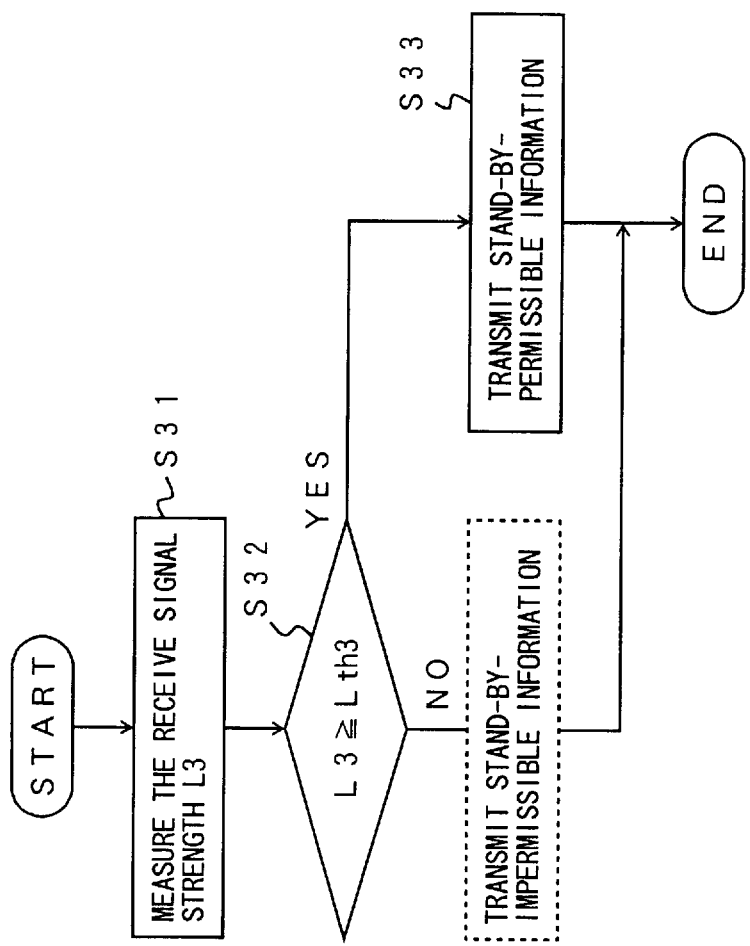
FIG. 10 shows a flowchart of an operation of a first embodiment of the base station equipment according to the present invention.
Figure 11A:
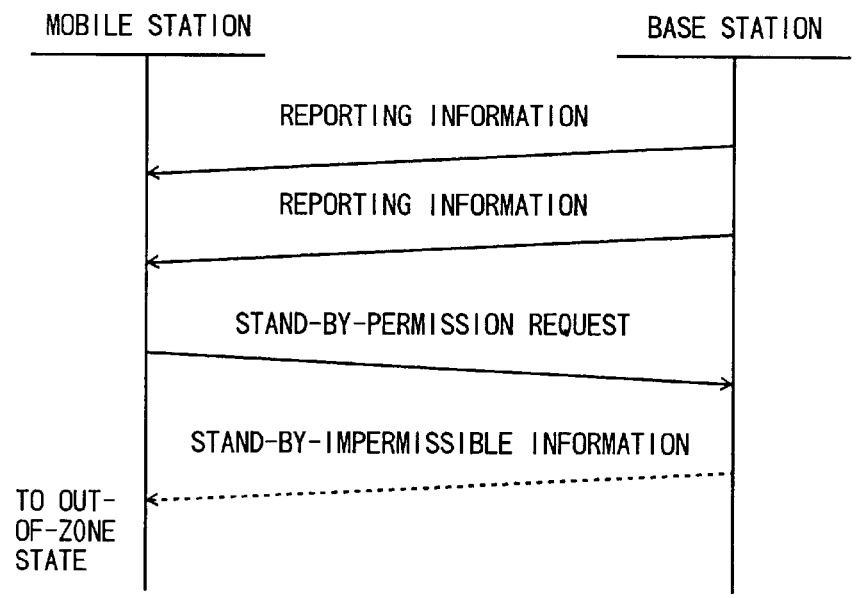
FIGS. 11A, 11B show control sequences between the mobile station and the base station.
Figure 11B:
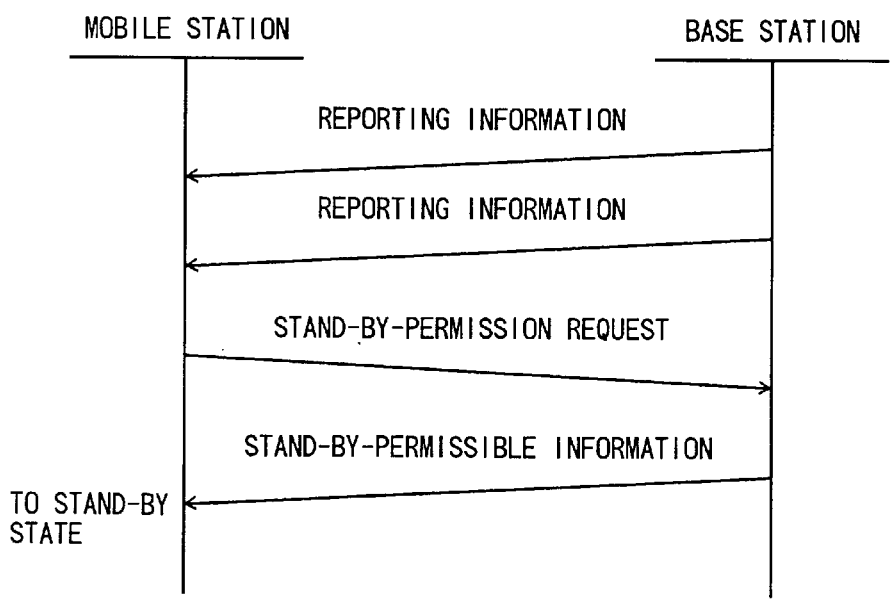

FIG. 9 shows a flowchart of the operation of the first embodiment of the mobile station equipment according to the present invention. FIG. 10 shows a flowchart of the operation of the first embodiment of the base station equipment according to the present invention. FIGS. 11A, 11B show control sequences between the mobile station and the base station.

A feature of the first embodiment is presented in a process before going to the stand-by state.

Figure 3:
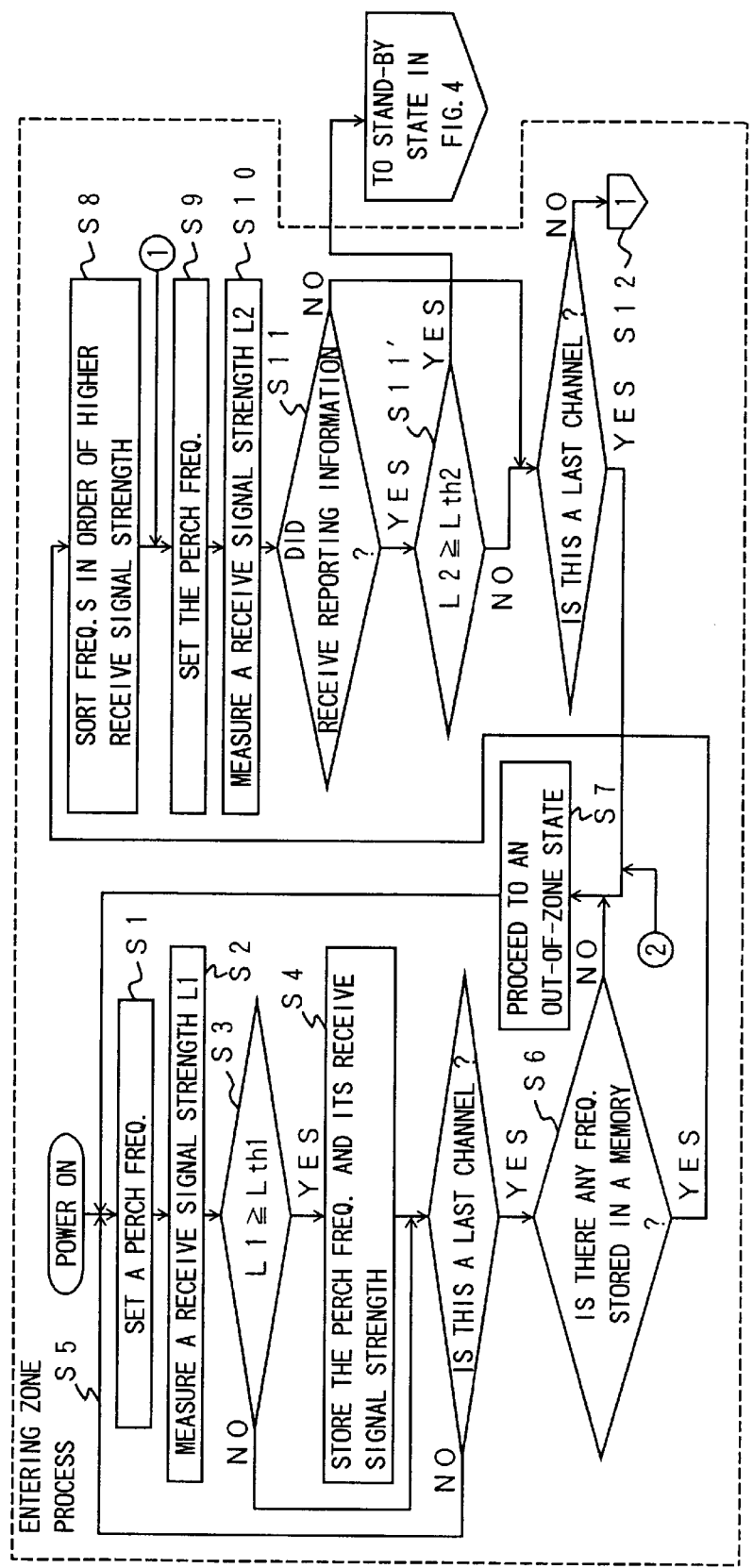
FIG. 3 and FIG. 4 show flowcharts of an operation of the conventional mobile station equipment shown in FIG. 2.
Figure 5:
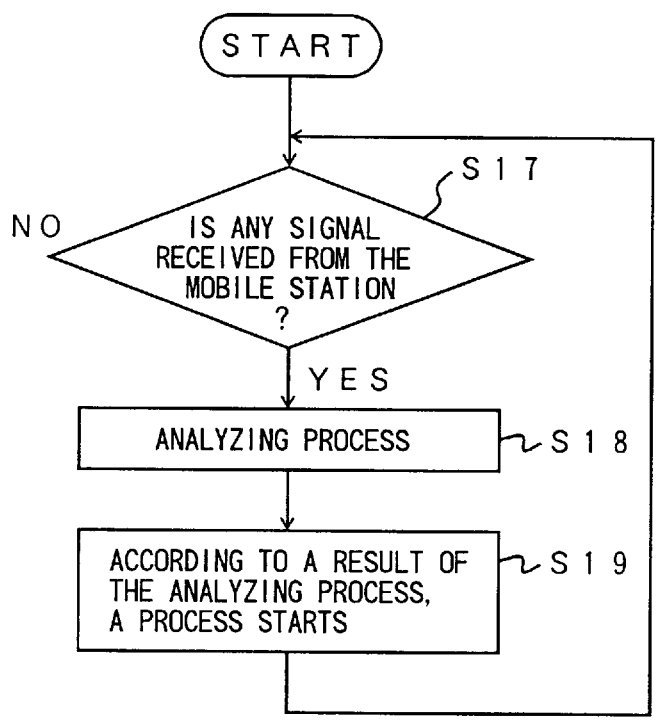
FIG. 5 shows a flowchart of an operation of the conventional base station equipment shown in FIG. 1.
Figure 6:
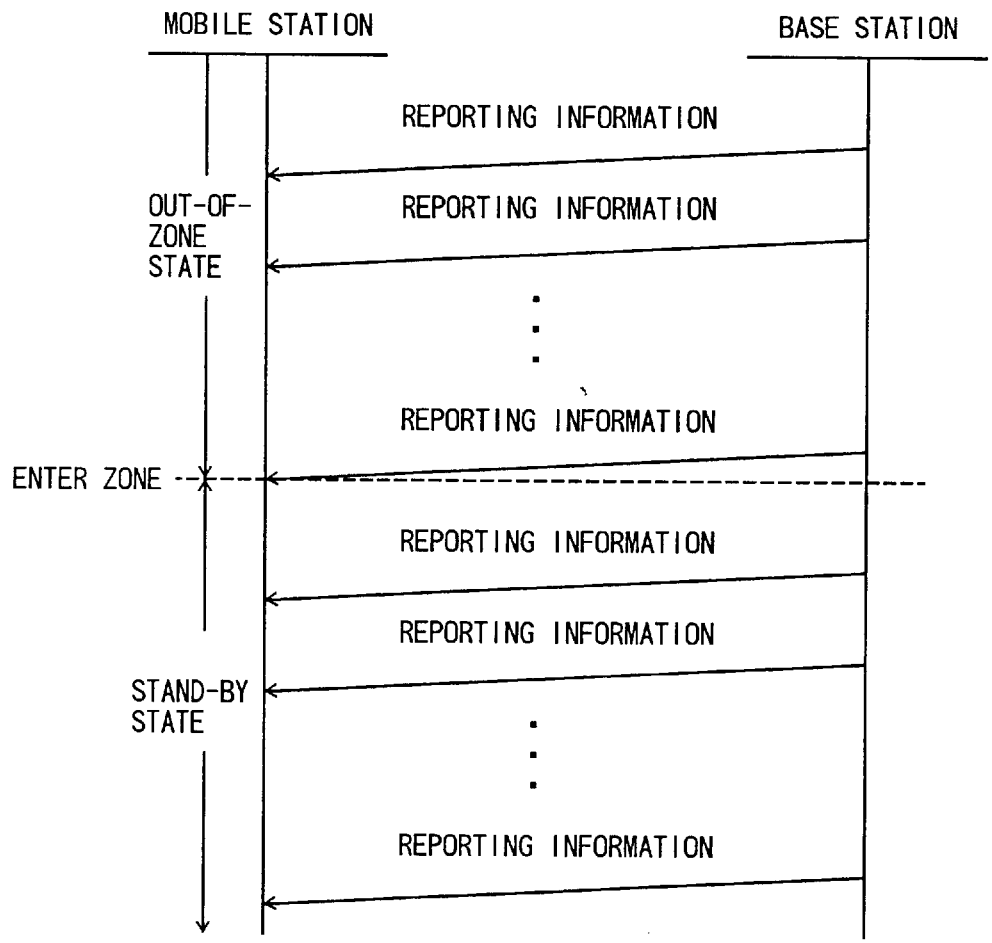
FIG. 6 shows a conventional control sequence between the mobile station equipment and the base station equipment.

In the mobile station equipment, when power is supplied, a state of the mobile station is transferred from an out-of-zone state to a stand-by state based on the same procedure as the conventional procedure (steps S1 to S12 shown in FIG. 3). However, in the mobile station equipment according to the present invention, a procedure shown in FIG. 9 is performed during the transference from the out-of-zone state to the stand-by state. On the other hand, in the base station equipment shown in FIG. 10, when any control information is received from the mobile station equipment, the control information is analyzed, and according to a result of the analysis, a proper process is carried out based on the same procedure as the conventional procedure (steps S17 to S19 shown in FIG. 5). The process in step S19 may include the procedure shown in FIG. 10, which is performed by the base-station control equipment 56.

In the mobile station equipment, when the state of the mobile station is transferred from the out-of-zone state, the process proceeds to the procedure shown in FIG. 9. In the procedure, the receive signal strength L3 of the selected perch frequency is measured by the down-link signal strength measuring means 13 (step S13'), and the measured receive signal strength L3 is compared with the down-link stand-by degradation level Lth3 by the inquiring means 14 (step S14'). When the receive signal strength L3 is smaller than the down-link stand-by degradation level Lth3, the state is returned back to the out-of-zone state. When the receive signal strength L3 is equal to or larger than the down-link stand-by degradation level Lth3, a stand-by-permission request is generated and is transmitted to the base station through the TDMA part 75, the waveform-shaping part 79, the quadrature modulator 80, the power amplifier 81, the transmit/receive duplexer 72, and the antenna 71-1, by the inquiring means 14 (step S21). FIG. 12 shows a signal format of the stand-by-permission request. The signal format of the stand-by-permission request is constructed with identification information and a number of the transmitting mobile station.

On the other hand, in the base station equipment, when the stand-by-permission request is received from the mobile station equipment, the base-station control equipment 56 of the responding means 23 starts a process adaptive to the request. In the above process, receive signal strength L3 of a signal from the mobile station equipment is measured by the up-link signal strength measuring means 21 (step S31 in FIG. 10), and the measured receive signal strength L3 is transmitted to the base-station control equipment 56 through the transmitting-and-receiving part and the shelf control part. Then, the base-station control equipment 56 compares the receive signal strength L3 with an up-link stand-by permission level Lth3 (step S32). When the receive signal strength L3 is equal to or larger than the up-link stand-by permission level Lth3, the base-station control equipment 56 generates stand-by-permissible information, and transmits it on a down-link radio channel (step S33). FIG. 13 shows a signal format of the stand-by-permissible information. The signal format of the stand-by-permissible information is constructed with the identification information and a number of the mobile station to where the information is transmitted.

Figure 4:
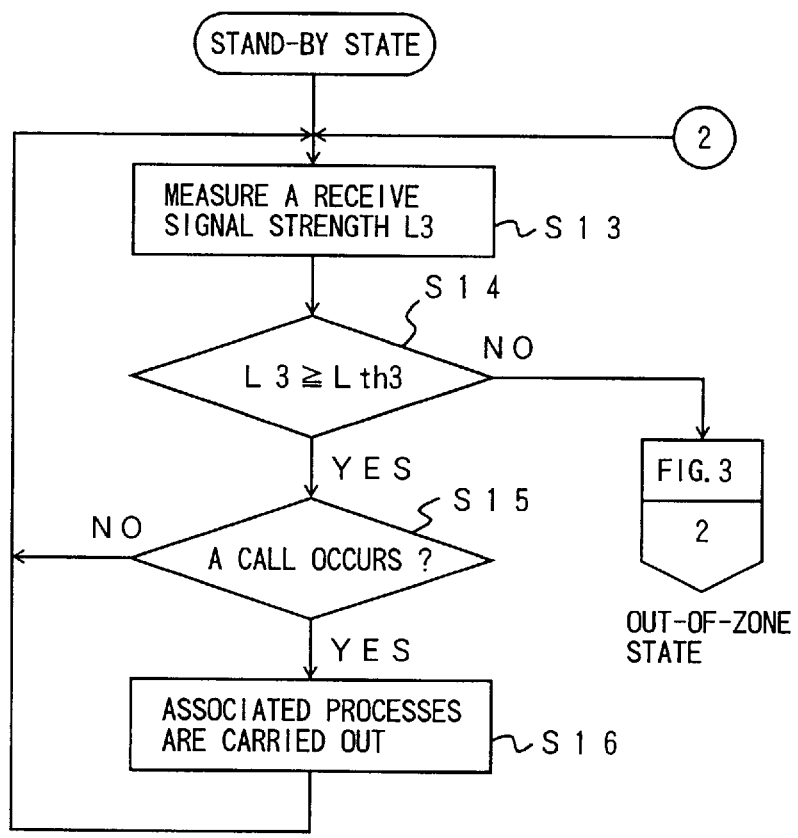

In the mobile station equipment, when the stand-by-permission request is transmitted to the base station (step S21 in FIG. 9), the stand-by control means 15 supervises a signal from the base station through the TDMA part 75 and waits for the stand-by-permissible information from the base station for a given time period (for example, several seconds) (step S22). As shown in FIG. 11A, when the stand-by-permissible information is not received within the given time period, the process returns to step S13' in FIG. 9. However, when the stand-by-permissible information is received within the given time period, the process proceeds to step S13 in FIG. 4 and the state is transferred to the stand-by state (step S23), as shown in FIG. 11B.

As mentioned above, in the procedure of steps S21 to S23 shown in FIG. 9, whether or not the receive signal strength in the base station is larger than the given value is confirmed by the inquiring means 14 and the stand-by control means 15. In the following description, the procedure of steps S21 to S23 is referred to as a process of confirming up-link-transmission performance.

In this way, according to the embodiment of the mobile station equipment, when the down-link receive signal strength in the mobile station equipment is larger than the down-link stand-by degradation level, and when the mobile station equipment confirms that the up-link receive signal strength in the base station equipment is larger than the up-link stand-by degradation level, the operation proceeds to the process for the stand-by state. Therefore, the difference between the transmission performance of the up- and down-link radio lines, which frequently occurs in the conventional equipment, may be reduced.

In the embodiment, when the mobile station equipment moves at a high speed, or when a time, after the stand-by-permission request is transmitted until the stand-by-permissible information is received, is long, a determination whether or not the down-link receive signal strength in the mobile station equipment is larger than the stand-by degradation level may be performed again at time when transferring to the stand-by state.

Figure 14:
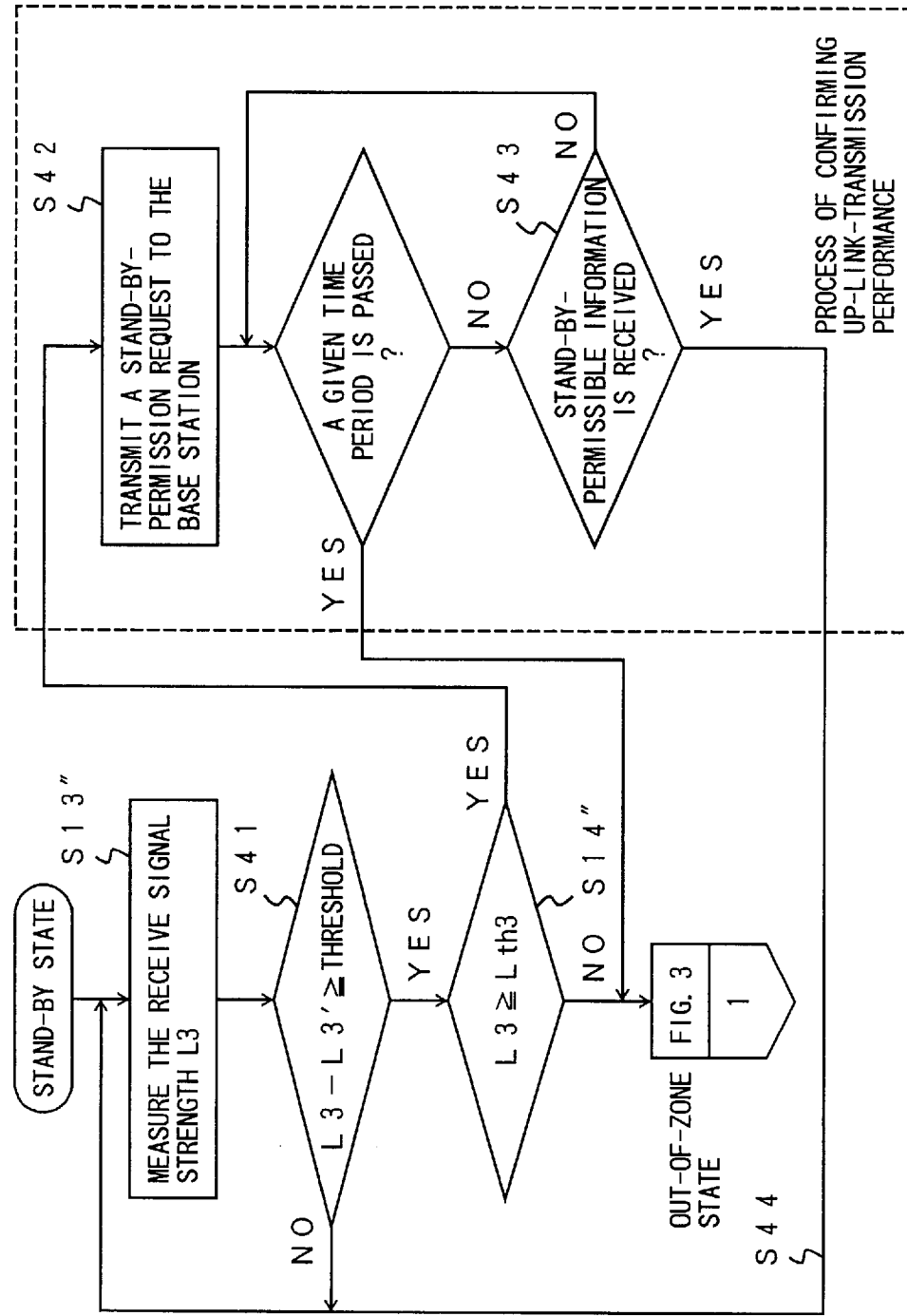
FIG. 14 shows a flowchart of an operation of a second embodiment of the mobile station equipment according to the present invention.

Next, operations will be discussed of second embodiments of the mobile station equipment and the base station equipment according to the present invention, by referring to FIG. 14 and FIG. 10. FIG. 14 shows a flowchart of the operation of the second embodiment of the mobile station equipment according to the present invention.

A feature of the second embodiment is presented in a process of the stand-by state of the mobile station equipment.

In the second embodiment of the mobile station equipment, a threshold indicating an upper limit of fluctuation of the receive signal strength is given. And, also in the stand-by state, the receive signal strength L3 of the broadcast signal from the base station is measured repeatedly in the same way as that in the out-of-zone state by the down-link signal strength measuring means 13 (step S13"). An amount of the fluctuation of the receive signal strength is obtained by subtracting a previously measured receive signal strength L3' from the measured receive signal strength L3. And, by the inquiring means 14, the amount of the fluctuation of the receive signal strength is compared with the above-mentioned threshold (step S41). When the amount of the fluctuation is equal to or larger than the threshold, the state is maintained at the stand-by state. However, when the amount of the fluctuation is smaller than the threshold, next, the measured receive signal strength L3 is compared with the down-link stand-by degradation level Lth3 by the inquiring means 4 (step S14"). When the measured receive signal strength L3 is smaller than the down-link stand-by degradation level Lth3, the state is transferred to the out-of-zone state shown in FIG. 3. When the measured receive signal strength L3 is equal to or larger than the down-link stand-by degradation level Lth3, the stand-by-permission request is transmitted to the base station as in the procedure of the first embodiment shown in FIG. 9 (step S42).

On the other hand, in the base station equipment, when the stand-by-permission request is received from the mobile station equipment, the receive signal strength L3 of the signal from the mobile station equipment is measured (step S31 in FIG. 10). The measured receive signal strength L3 is transmitted to the base-station control equipment 56 of the responding means 23, and is compared with the up-link stand-by permission level Lth3 (step S32). When the receive signal strength L3 is equal to or larger than the up-link stand-by permission level Lth3, the base-station control equipment 56 generates the stand-by-permissible information, and transmits it on a down-link radio channel (step S33).

In the mobile station equipment, when the stand-by-permission request is transmitted to the base station (step S42 in FIG. 14), the stand-by control means 15 waits for the stand-by-permissible information from the base station for a given time period after the stand-by-permission request is transmitted (step S43 in FIG. 14). When the stand-by-permissible information is not received within the given period, the process returns to the out-of-zone state shown in FIG. 3. While, when the stand-by-permissible information is received within the given period, the process proceeds to step S13" in FIG. 14 and the state is transferred to the stand-by state (step S44).

In this way, according to the second embodiment, the mobile station equipment may determine whether or not the transmission performance of the up-link radio line is extremely degraded when the receive signal strength in the mobile station equipment is extremely reduced. According to the determination, the mobile station equipment may properly determine whether the control process is maintained at the stand-by state or is transferred to the out-of-zone state. Therefore, a quality of a communication service may be maintained at a high level.

In the base station of the second embodiment, as shown in FIG. 10, when the measured receive signal strength L3 is equal to or larger than the up-link stand-by-permission level Lth3, the stand-by-permissible information is transmitted to the mobile station equipment. The present invention is not limited to the above embodiment. For example, as shown in a dotted line of FIG. 10, when the receive signal strength L3 is smaller than the up-link stand-by-permission level Lth3, stand-by-impermissible information may be transmitted to the mobile station equipment. Further, a strength relationship between the measured receive signal strength L3 and the up-link stand-by-permission level Lth3 may be directly transmitted to the mobile station equipment.

Figure 15:
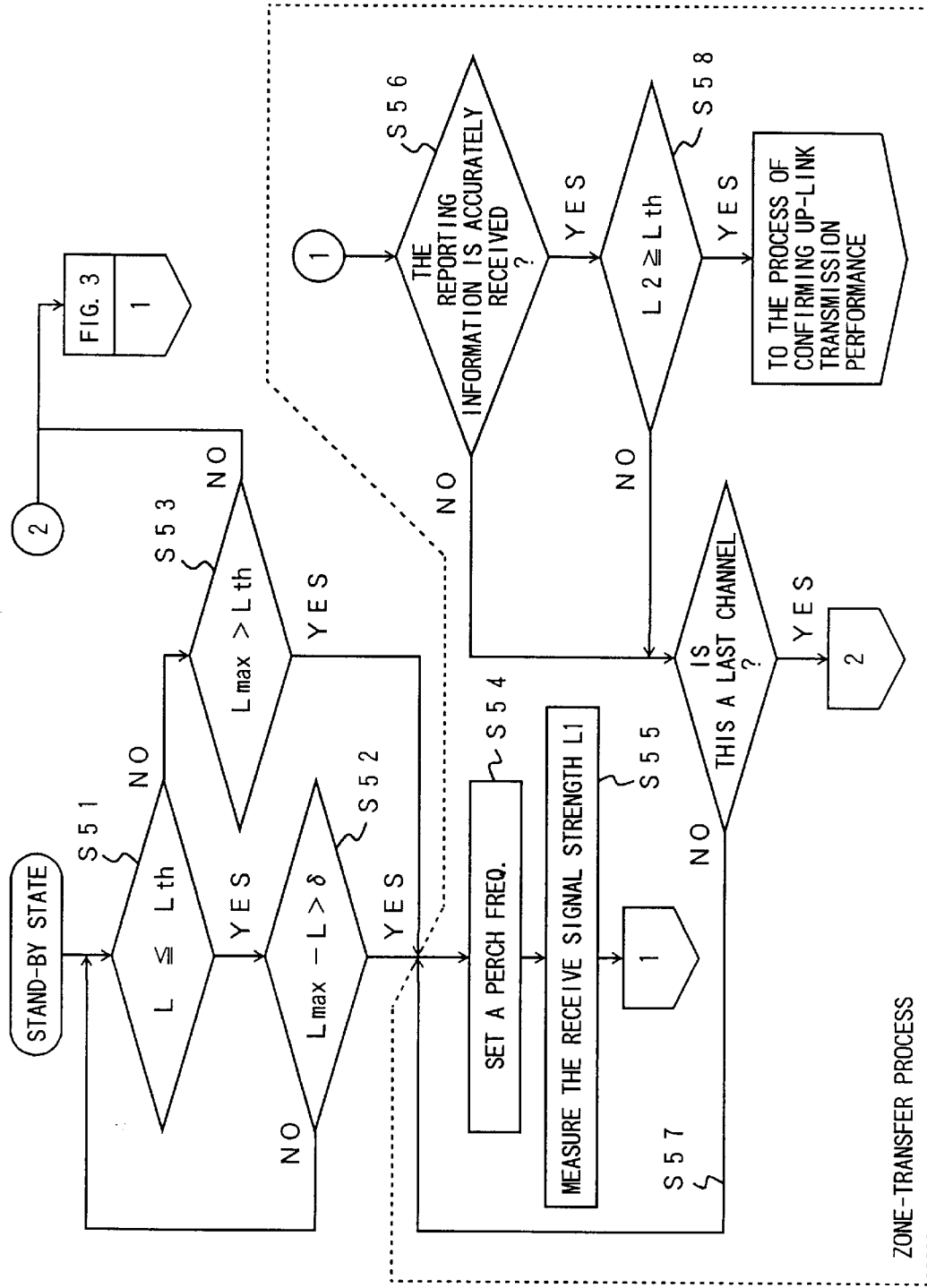
FIG. 15 shows a flowchart of an operation of a third embodiment of the mobile station equipment according to the present invention.

Next, operations will be discussed of third embodiments of the mobile station equipment and the base station equipment according to the present invention, by referring to FIG. 15 and FIG. 10. FIG. 15 shows a flowchart of the operation of the third embodiment of the mobile station equipment according to the present invention.

A feature of the third embodiment is presented in a process by which the mobile station equipment in the stand-by state transfers to another radio zone.

In the third embodiment of the mobile station equipment, a transfer-determination start level Lth is previously given, and the level Lth is a lower limit level of the receive signal strength in which the mobile station equipment is permitted to transfer to the radio zone. In FIG. 15, receive signal strength L of the broadcast information from the base station equipment is compared with the transfer-determination start level Lth by the zone-transfer detection means 42 (step S51). When the receive signal strength L is equal to or smaller than the transfer-determination start level Lth, a maximum receive signal strength Lmax of a signal from an adjacent base station equipment is measured by the adjacent-zone signal strength measuring means 41. And, a difference between the maximum receive signal strength Lmax and the receive signal strength L is compared with a given threshold δ (step S52). When the difference is larger than the threshold δ, the operation proceeds to the following zone-transfer process by the zone-transfer detection means 42.

In step S51, when the receive signal strength L is larger than the transfer-determination start level Lth, the maximum receive signal strength Lmax of the signal from the adjacent base station equipment is measured by the adjacent-zone signal strength measuring means. And, the maximum receive signal strength Lmax is compared with the transfer-determination start level Lth (step S53). When the maximum receive signal strength Lmax is equal to or smaller than the transfer-determination start level Lth, the operation proceeds to the out-of-zone state shown in FIG. 3. When the maximum receive signal strength Lmax is larger than the transfer-determination start level Lth, the operation proceeds to the following zone-transfer process by the zone-transfer detection means 42.

Next, the zone-transfer process will be discussed. In FIG. 15, one of the single or plural perch frequencies previously stored in the memory is selected and is set in the frequency synthesizer 82 (step S54). The frequency synthesizer 82 generates a local signal at the selected perch frequency, and provides the local signal to the receiving parts 73-1, 73-2 and the quadrature modulator 80. The receiving part 73-2 measures receive signal strength L1 of the broadcast signal from the adjacent base station equipment on a radio channel of the selected perch frequency (step S55). And, the broadcast signal is supplied to the demodulator 74 through the receiving part 73-1, and is demodulated to generate the baseband signal. The TDMA part 75 analyzes the baseband signal based on the predetermined frame structure and provides the analyzed result to the decision means 12.

The decision means 12 examines accuracy of data of the broadcast information and determines whether or not the broadcast signal is accurately received (step S56). When the decision means 12 determines that the broadcast information is not accurately received, the processes of steps S54 to S56 are successively repeated for remaining perch frequencies of the perch frequencies stored in the memory (step S57).

On the other hand, when the decision means 12 determines that the broadcast information is accurately received, the down-link signal strength measuring means 13 measures the receive signal strength L2 of the broadcast signal through the receiving part 73-2 again, and compares the measured receive signal strength L2 with a given down-link stand-by permission level Lth (step S58). When the inquiring means 14 recognizes that the receive signal strength L2 is smaller than the down-link stand-by permission level Lth, the processes of steps S54 to S56 are successively repeated in order of higher strength for the remaining perch frequencies stored in the memory in the same way as when the broadcast signal is not accurately received on the selected perch channel (step S57). However, when the control part 83 recognizes that the receive signal strength L2 is equal to or larger than the down-link stand-by permission level Lth, the inquiring means 14 controls transmission of the stand-by-permission request to the base station equipment as in step S21 in FIG. 9. And, as in steps S22, S23 in FIG. 9, after the stand-by-permissible information is received, the process proceeds to the stand-by state.

According to the third embodiment, when the mobile station equipment in the stand-by state is transferring to the adjacent radio zone, after it is confirmed that there is a large difference between the transmission performance of up- and down-link radio lines between the mobile station equipment and the adjacent base station equipment, the process of transferring the radio zone is carried out. Therefore, in also the radio zone where the mobile station equipment transfers to, the good up- and down-link transmission performance may be obtained.

Figure 16:
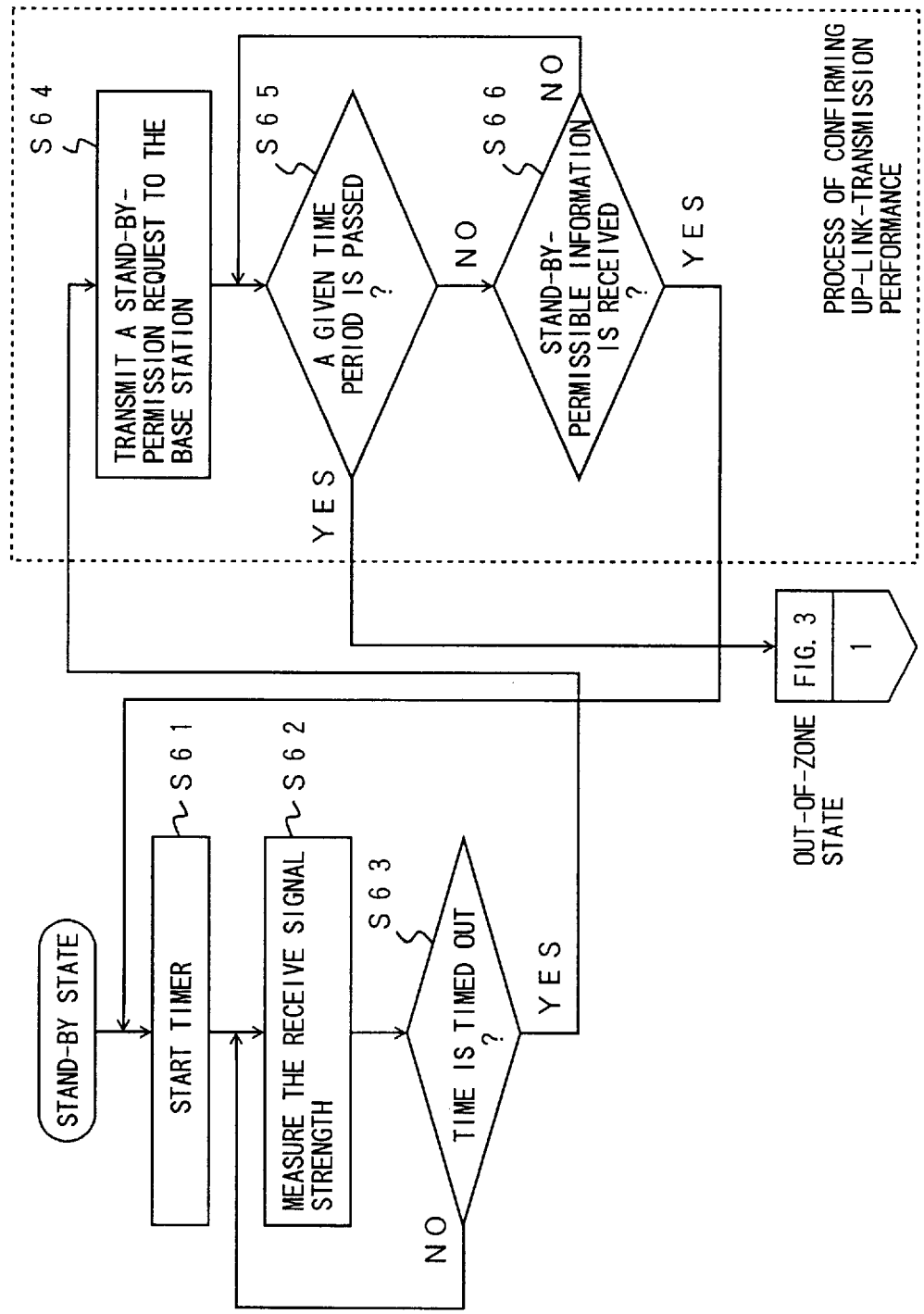
FIG. 16 shows a flowchart of an operation of a fourth embodiment of the mobile station equipment according to the present invention.

Next, operations will be discussed of a fourth embodiment of the mobile station equipment according to the present invention, by referring to FIG. 16 and FIG. 10. FIG. 16 shows a flowchart of the operation of the fourth embodiment of the mobile station equipment according to the present invention.

A feature of the fourth embodiment is presented in a process for starting the process of confirming up-link transmission performance shown in FIG. 14.

In FIG. 16, in the mobile station equipment, the control part 83 starts a timer having a given time interval in the stand-by state (step S61). And, the down-link signal strength measuring means 13 measures the receive signal strength of the broadcast signal received from the base station (step S62) until the timer is timed out (step S63). After the timer is timed out, the control part 83 carries out the process of confirming up-link transmission performance. When the confirming process is completed, the control part 83 carries out the above-mentioned processes of steps S61 to S63 again. After that, the same processes are repeated.

In the above process, the process of confirming up-link transmission performance and the associated processes in the mobile station equipment and the base station equipment are the same as that described in FIG. 14 and FIG. 10.

According to the fourth embodiment, even if the mobile station equipment does not transfer to another radio zone and no extreme degradation of the transmission performance occurs in the down-link radio line, whether or not the receive signal strength in the base station equipment is equal to or larger than the up-link stand-by permission level Lth3 is confirmed at the given time interval by the mobile station equipment. The mobile station equipment determines whether the mobile station equipment remains in the stand-by state or transfers to the out-of-zone state. Therefore, the degradation of the up-link radio transmission performance may be further prevented. And, a possibility of the occurrence of the unconnected call may be reduced and the degradation of the speech quality may be efficiently prevented.

Figure 17:
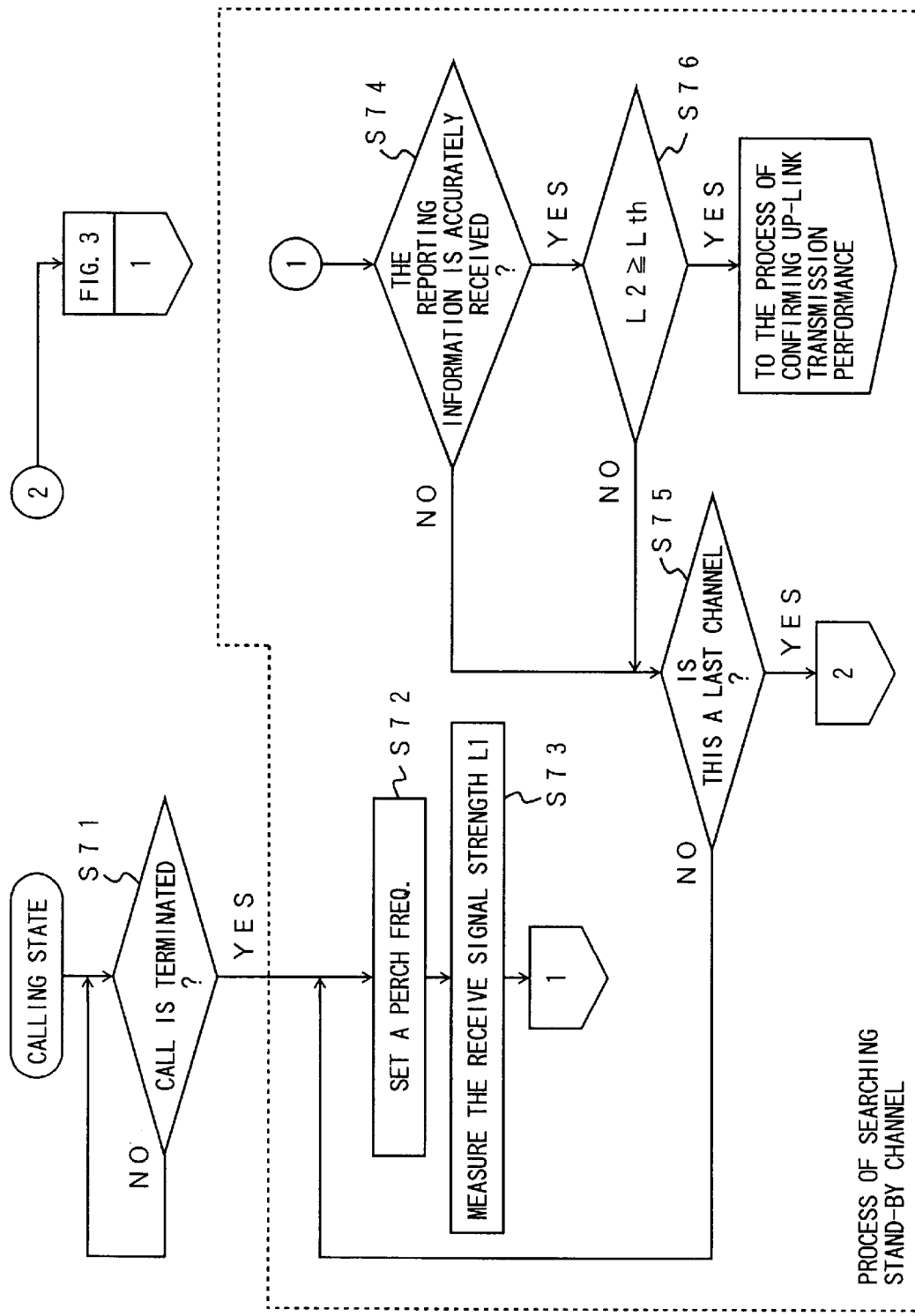
FIG. 17 shows a flowchart of an operation of a fifth embodiment of the mobile station equipment according to the present invention.

Next, operations will be discussed of a fifth embodiment of the mobile station equipment according to the present invention, by referring to FIG. 17 and FIG. 10. FIG. 17 shows a flowchart of the operation of the fifth embodiment of the mobile station equipment according to the present invention.

A feature of the fifth embodiment is presented in a process for starting the process of searching a stand-by channel which is similar to the zone-transfer process shown in FIG. 15 confirming up-link transmission performance.

In FIG. 17, in the mobile station equipment, when the control part 83 detects an on-hook signal in a connected call, the control part 83 starts the process of searching the stand-by channel.

In the following, an operation of the process of searching the stand-by channel will be discussed as compared to the zone-transfer process. In the process of searching the stand-by channel shown in FIG. 17, when the control part 83 detects the on-hook signal (step S71), a perch frequency is set in the frequency synthesizer 82 (step S72). In the case of the zone-transfer process shown in FIG. 15, the perch frequencies are stored in the memory in an order of higher strength. The following processes of steps S73 to S76 are the same as that of steps S55 to S58 shown in FIG. 15.

According to the fifth embodiment shown in FIG. 17, after the call is terminated by the on-hook in the mobile station equipment, a channel, on which there is a large difference between the up- and down-link radio line transmission performance, may be surely selected for a control channel of the stand-by state. Therefore, for the following initiated calls, the possibility of the occurrence of the unconnected call may be reduced and the degradation of the speech quality may be efficiently prevented.

Next, operations will be discussed of a sixth embodiment of the mobile station equipment and the base station equipment according to the present invention, by referring to FIG. 18. FIG. 18 shows a flowchart of the operation of the sixth embodiment of the mobile station equipment according to the present invention.

In sixth embodiment shown in FIG. 18, first, a fact that the state of the mobile station equipment is in the out-of-zone state is confirmed by the state detection means 43. For example, after the power is on, the state of the mobile station equipment is in the out-of-zone state. After that, the control part 83 carries out the entering-zone process (which selects the radio channel for the stand-by state while the mobile station equipment is in the out-of-zone state) as shown in FIG. 3. And, the control part 83 carries out the process of confirming up-link transmission performance. When it is confirmed that there is no large difference between the up- and down-link radio line transmission performances based on the confirming process, the process proceeds to the stand-by state. In such a process of confirming up-link transmission performance, the base-station control equipment 56 in the base station side compares the receive signal strength with the up-link stand-by state permission level which is set to a level higher than the up-link stand-by state degradation level. The above mentioned two points are different from the conventional processes and equipment.

According to the sixth embodiment, in the process of going to an inside-of-zone state after the power is on or the equipment is in the out-of-zone state, it is confirmed that there is no large difference between the up- and down-link radio line transmission performances. After that, the radio channel for the stand-by state is determined.

Next, operations will be discussed of a seventh embodiment of the mobile station equipment according to the present invention, by referring to FIG. 19.

In the seventh embodiment, differences from the first embodiment are present in a format of the stand-by-permission request transmitted to the base station in the process of confirming the up-link transmission performance, and a process of the base-station control equipment 56 in response to the request. Detail descriptions of the differences follow.

FIG. 19 shows signal formats of the stand-by-permission request signal and dummy burst signals in the seventh embodiment of the mobile station equipment. In the mobile station equipment, when the inquiring means 14 transmits the stand-by-permission request to the base station in the process of confirming the up-link transmission performance, first the inquiring means 14 transmits the stand-by-permission request formed by this mobile station identification number and the identification information indicating that this signal is a stand-by-permission request signal, as shown in FIG. 19. And, subsequently, the inquiring means 14 transmits a given number (n−1) of dummy burst signals having only the mobile station identification number at a given time interval.

In the base station equipment, the base-station control part 56 successively receives the stand-by-permission request signal and the dummy burst signals and measures respective receive signal strengths E-1 to E-n of the above signals. FIG. 20 shows receive signal strengths of the stand-by-permission request signal and the dummy burst signals shown in FIG. 19. As shown in FIG. 20, the receive signal strengths thus measured are averaged, and the average of the receive signal strengths is compared with the up-link stand-by degradation level and the up-link stand-by permission level.

In this way, since the strength of the stand-by-permission request signal is measured for the several signals, the receive signal strength thereof may be accurately obtained.

Therefore, when the transmission rate is high, and when a time interval of the burst signal is too short to obtain a sufficient margin for a response time of the transmitting-and-receiving part in the base station equipment (for example, digital mobile communication system), even if a part of the above-mentioned dummy burst signals is not received due to the above situations, if the top stand-by-permission request signal is regularly received in the base station equipment, the transmission performance may be accurately obtained and the good up- and down-link transmission performance may be achieved.

Next, operations will be discussed of an eighth embodiment of the mobile station equipment according to the present invention, by referring to FIG. 21.

In the eighth embodiment, a difference from the seventh embodiment is present in a signal format of the stand-by-permission request signal. FIG. 21 shows signal formats of the up-link stand-by permission request signals of the eighth embodiment of the mobile station equipment.

In the mobile station equipment, when the inquiring means 14 transmits the stand-by-permission request to the base station in the process of confirming the up-link transmission performance, the inquiring means 14 successively transmits a plurality (n) of the stand-by-permission request signals at a given time interval, each signal being formed by this mobile station identification number and the identification information indicating that this signal is a stand-by-permission request signal, as shown in FIG. 21.

In the base station equipment, the base-station control part 56 of the responding means 23 successively receives the plurality of the stand-by-permission request signals and measures respective receive signal strengths of the above signals while confirming the mobile station identification number to be the same. Also in this case, the receive signal strengths of the stand-by-permission request signals thus measured are averaged, and the average of the receive signal strength is compared with the up-link stand-by permission level.

According to the eighth embodiment, in the base station equipment, since a plurality of stand-by-permission request signals are received from the same mobile station equipment, a highly accurate receive signal strength of the stand-by-permission request may be obtained. Therefore, when the transmission rate is high, and when the time interval of the burst signal is too short to obtain the sufficient margin for the response time of the transmitting-and-receiving part in the base station equipment (for example, digital mobile communication system), even if a part of the above-mentioned plurality of stand-by-permission request signals is not received due to the above situations, the transmission performance may be accurately obtained and the good up- and down-link transmission performance may be achieved.

In the above-mentioned embodiments, the reference levels for comparing the receive signal strength in the base station equipment to produce the stand-by-permissible information, etc., are fixed to the predetermined threshold values. However, the present invention is not limited to the embodiments. For example, based on managing information in the base station equipment whether or not the mobile station equipment is within the own radio zone, one of the up-link stand-by permission level and the up-link stand-by degradation level may be selected and set. Or, based on information whether or not the mobile station equipment is within the radio zone which is transmitted with the stand-by-permission request to the base station equipment, one of the up-link stand-by permission level and the up-link stand-by degradation level may be selected and set.

In the above-mentioned embodiments, the present invention is described for the digital mobile communication system. However, the present invention is not limited to the above system, but is applicable to other systems. For example, in a system, the base station can surely discriminate which of the mobile station equipment requests the stand-by permission to the base station, based on the receive signal strength in the base station equipment. Also in the system, an increase of traffic due to the additional transmission for the permission request and the permissible information is permitted. In such a system, the present invention may be used regardless of the radio channel structure (including the control channel structure and a number of channels), the access control method, the zone structure, the transmission method (including transmission rate, modulation and demodulation method), the coding method in the transmission path, etc. Furthermore, the present invention is not limited to the system constructing the public mobile communication network, and may be used for a private mobile communication system using a large zone method.

In the above-mentioned embodiments, to transmit and receive the stand-by-permission request, the stand-by-permissible information and the stand-by-impermissible information, the traffic of the radio channel and the processing load for the communication control of the radio channel must be increased. When the increase of the traffic and the processing load becomes too large to be neglected, the radio lines and the processing apparatus may be constructed by using a load-distribution method.

As described above, the present invention has the following features.

According to the above mobile station equipment, the base station equipment and the control method, after it is confirmed that down-link radio line transmission performance is sufficient to supply the communication service, the confirmation result as the permission request is transmitted to the base station. And, when the permissible information in response to the confirmation result is received, the mobile station equipment proceeds to the stand-by state process.

Therefore, both the up- and down-link radio line transmission performances may be confirmed before the stand-by state process, and a good quality communication service may be surely provided.

Further, the present invention is not limited to these embodiments, but various variations and modifications may be made without departing from the scope of the present invention.

What is claimed is:

1. Mobile station equipment for a mobile communication system comprising:

decision means for deciding accuracy of data of a first signal transmitted from a base station;

first signal strength measuring means for measuring a signal strength of said first signal;

inquiring means for transmitting a permission request signal for the mobile station equipment proceeding to a stand-by state process to the base station according to at least one of the decided accuracy and a comparison result of the measured signal strength of the first signal and a first given threshold value; and stand-by control means for waiting for permissible information to be transmitted from the base station based on said permission request signal, and for starting the stand-by state process upon receiving the permissible information.

2. The mobile station equipment as claimed in claim 1, wherein said stand-by control means further comprises control means for waiting for impermissible information transmitted from the base station based on said permission request signal, and for proceeding to an out-of-zone state upon receiving the impermissible information.

3. The mobile station equipment as claimed in claim 2, wherein said inquiring means further comprises means for transmitting said permission request signal to the base station at a given time interval in a stand-by state.

4. The mobile station equipment as claimed in claim 2, wherein said inquiring means further comprises means for transmitting said permission request signal to the base station according to said decided accuracy and said comparison result of the measured signal strength of the first signal and the first given threshold value when a communication is finished.

5. The mobile station equipment as claimed in claim 2, wherein:
said equipment further comprises state detection means for detecting that a state of the mobile station equipment is an out-of-zone state; and
said inquiring means further comprises means for transmitting said permission request signal for said stand-by state process to the base station according to said decided accuracy and said comparison result of the measured signal strength of the first signal and the first given threshold value when said state detection means detects that the state of the mobile station equipment is the out-of-zone state.

6. The mobile station equipment as claimed in claim 2, wherein said permission request signal transmitted by the inquiring means comprises a plurality of frames, a first frame having identification information which indicates that this frame is for the permission request signal and identification information of said mobile station equipment, and each of the following frames having the identification information of said mobile station equipment.

7. The mobile station equipment as claimed in claim 2, wherein said permission request signal transmitted by the inquiring means comprises a plurality of frames, each of the frames having identification information which indicates that this frame is for the permission request signal and identification information of said mobile station equipment.

8. The mobile station equipment as claimed in claim 1, wherein said equipment further comprises:
third signal strength measuring means for measuring a signal strength of a second signal from an adjacent base station in a stand-by state; and
zone-transfer detection means for comparing a difference between said measured signal strength of said first signal from the base station and the measured signal strength of said second signal from the adjacent base station with a third given value, and for determining whether the mobile station equipment is located in a radio zone defined by said adjacent base station according to the comparison result of the difference and the third given value;
wherein each of said decision means and said stand-by control means further comprises means for changing the base station to the adjacent base station recognized by the zone-transfer detection means, and for switching a radio channel suitable for the adjacent base station.

9. The mobile station equipment as claimed in claim 1, wherein said inquiring means further comprises means for transmitting said permission request signal to the base station at a given time interval in a stand-by state.

10. The mobile station equipment as claimed in claim 1, wherein said inquiring means further comprises means for transmitting said permission request signal to the base station according to said decided accuracy and said comparison result of the measured signal strength of the first signal and the first given threshold value when a communication is finished.

11. The mobile station equipment as claimed in claim 1, wherein:
said equipment further comprises state detection means for detecting that a state of the mobile station equipment is an out-of-zone state; and
said inquiring means further comprises means for transmitting said permission request signal for said stand-by state process to the base station according to said decided accuracy and said comparison result of the measured signal strength of the first signal and the first given threshold value when said state detection means detects that the state of the mobile station equipment is the out-of-zone state.

12. The mobile station equipment as claimed in claim 1, wherein said permission request signal transmitted by the inquiring means comprises a plurality of frames, a first frame having identification information which indicates that this frame is for the permission request signal and identification information of said mobile station equipment, and each of the following frames having the identification information of said mobile station equipment.

13. The mobile station equipment as claimed in claim 1, wherein said permission request signal transmitted by the inquiring means comprises a plurality of frames, each of the frames having identification information which indicates that this frame is for the permission request signal and identification information of said mobile station equipment.

14. Base station equipment for a mobile communication system comprising:
second signal strength measuring means for measuring a signal strength of a permission request signal for proceeding to a stand-by state process, said permission request signal being transmitted from a mobile station when the mobile station receives a given signal from a base station and thus confirms that a quality of transmission from the base station to the mobile station reaches a level sufficient to provide communication services; and
responding means for transmitting permissible information for permitting the mobile station to proceed to the stand-by state process to the mobile station according to a comparison result of the signal strength of the permission request signal a second given threshold value.

15. The base station equipment as claimed in claim 2, wherein said responding means comprises means for transmitting impermissible information for not permitting the mobile station to proceed to the stand-by state process to the mobile station when the signal strength of the permission request signal is smaller than the second given threshold value.

16. The base station equipment as claimed in claim 14, wherein when said second given threshold value used in said responding means becomes higher than a signal strength in the base station equipment, it is determined that the mobile station in a radio zone defined by said base station equipment goes to an out-of-zone state.

17. The base station equipment as claimed in claim 14, wherein when said second given threshold value used in said responding means is smaller than a signal strength in the base station equipment, the mobile station is permitted to go to an inside-of-zone state for a radio zone defined by the base station equipment.

18. A control method for controlling a mobile station to proceed to a stand-by state in a mobile communication system, said control method comprising the steps of:

(a) deciding accuracy of data of a first signal transmitted from a base station in the mobile station;

(b) measuring a signal strength of said first signal in the mobile station;

(c) transmitting a permission request signal for the mobile station proceeding to a stand-by state process from the mobile station to the base station according to the decided accuracy in step (a) and a comparison result of the measured signal strength of the first signal in step (b) and a first given threshold value;

(d) measuring a signal strength of said permission request signal transmitted from the mobile station in the base station;

(e) transmitting permissible information for permitting the mobile station to proceed to the stand-by state process from the base station to the mobile station according to a comparison result of the signal strength of the permission request signal in step (d) and a second given threshold value; and (f) waiting for permissible information to be transmitted from the base station equipment, and starting the stand-by state process when receiving the permissible information in the mobile station.

19. The control method as claimed in claim 18, wherein:

said step (e) further comprises a step of transmitting impermissible information for not permitting the mobile station to proceed to the stand-by state process from the base station to the mobile station when the signal strength of the permission request signal is smaller than the second given threshold value; and said step (f) further comprises a step of waiting for impermissible information to be transmitted from the base station equipment, and proceeding to an out-of-zone state when receiving the impermissible information.

* * * * *